(12) United States Patent
Mattsson et al.

(10) Patent No.: US 7,599,442 B2
(45) Date of Patent: Oct. 6, 2009

(54) TRANSMITTER SYNCHRONIZATION IN A DISTRIBUTED TRANSMISSION SYSTEM

(75) Inventors: Anders S. Mattsson, Mason, OH (US); Carlos Abascal, Middletown, OH (US)

(73) Assignee: Harris Corporation, Melbourne, FL (US)

( * ) Notice: Subject to any disclaimer, the term of this patent is extended or adjusted under 35 U.S.C. 154(b) by 593 days.

(21) Appl. No.: 11/038,997

(22) Filed: Jan. 20, 2005

(65) Prior Publication Data

US 2006/0159193 A1  Jul. 20, 2006

(51) Int. Cl.
*H04L 27/00* (2006.01)
(52) U.S. Cl. ...................................... 375/265; 375/295
(58) Field of Classification Search ......... 375/259–261, 375/265, 316, 340, 341, 295
See application file for complete search history.

(56) References Cited

U.S. PATENT DOCUMENTS

| | | | | |
|---|---|---|---|---|
| 5,233,349 A * | 8/1993 | Moulsley | | 341/107 |
| 7,298,741 B2 * | 11/2007 | Hung | | 370/389 |
| 2001/0000706 A1 * | 5/2001 | Butler et al. | | 375/340 |
| 2002/0140867 A1 * | 10/2002 | Weiss | | 348/723 |
| 2003/0190002 A1 | 10/2003 | Azakami et al. | | |
| 2005/0094748 A1 * | 5/2005 | Zaboronski et al. | | 375/341 |

* cited by examiner

*Primary Examiner*—Kevin M Burd
(74) *Attorney, Agent, or Firm*—Tarolli, Sundheim, Covell & Tummino LLP

(57) ABSTRACT

Systems and methods are provided for synchronizing a plurality of transmitters in a distributed transmission system. A data source generates a digital signal. A central data processing component inserts synchronization data into the digital signal. The synchronization data includes a periodic reset signal. A plurality of radio frequency transmitters each comprises a Trellis coder. At least one Trellis coder state at each Trellis coder is reinitialized to a predefined default state in response to the reset signal.

10 Claims, 2 Drawing Sheets

TRANSMITTER SYNCHRONIZATION IN A DISTRIBUTED TRANSMISSION SYSTEM

TECHNICAL FIELD

The present invention relates to RF communication systems and is particularly directed to systems and methods for synchronizing a plurality of transmitters in a distributed transmission system.

BACKGROUND OF THE INVENTION

High definition television (HDTV) is now being introduced. One aspect is the transmission system known as the Grand Alliance Advanced Television (ATV) system. The transmission system employed is also known as the 8 vestigial sideband (8-VSB) digital transmission system. The ATV VSB transmission system is known and need not be described in detail. By way of background, the 8-VSB system may operate in a broadcast mode with 8-level symbols (3 bits per symbol). Before transmission, data are received serially and randomized, forward-error-corrected (FEC) using a Reed-Solomon coding technique, interleaved and trellis coded. The format for this Transmission Layer signal is a data frame which includes synchronization signals.

A data frame for the Transmission Layer 8-VSB system includes two fields of 312 segments and two field synchronization segments, each of which are 832 symbols long. The first four symbols in each segment are segment synchronization symbols. Subsequent segments convey data formatted in the manner discussed above (randomized and coded). The data segments include the FEC codes. In the 8-VSB format, the field synchronization segments are placed at the beginning of each field (e.g., the first and $314^{th}$ segments of a 626 segment frame).

In accordance with the Advanced Televisions Systems Committee (ASTC) standards, a digital television system can be implemented as a distributed transmission system (e.g., a Single Frequency Network or SFN), having a central data processor and a plurality of associated spatially diverse transmitters. One of the obstacles of implementing a distributed network is synchronizing the various transmitters to avoid straining equalizers at the receiving end with multiple delayed copies of the same signal. Generally, synchronization of most components can be achieved via a synchronization data embedded in the signal.

In general, synchronization information in a digital video signal along with a standard time reference (e.g., via a global positioning system (GPS) receiver) allow for synchronization of the majority of the components in the transmitters. The transmitters, however, contain Trellis coders and pre-coders that contain memory, such that the output of a given coder is dependant on prior states of the coder. Each transmitter contains the equivalent of twelve Trellis encoders, and the state of these Trellis encoders should be periodically synchronized across the transmitters to maintain their synchronous operation.

In a prior implementation of a synchronized transmitter arrangement, described in U.S. Patent Application 2002/0140867 by Weiss, synchronization of the Trellis coders is achieved by sending packets of reference information relating to the desired states of the Trellis encoders. Each packet contains thirty-six bits of information, three bits for each of the virtual Trellis coders associated with a given transmitter. The three bits for each encoder are inserted into the virtual coders to force the Trellis coders into the desired states. The appropriate state for each coder is determined from a reference exciter at the central data processor. Packets can be sent repeatedly over a given data frame to increase the likelihood that a valid reference packet will be received, as synchronization of the transmitters cannot be achieved without these packets in the Weiss system.

It will be appreciated that the Weiss system can require packets to be sent fairly frequently, decreasing the effective bit rate of the system. Further, the Weiss system requires a reference exciter at the central data processor, which adds expense and complexity to the system.

SUMMARY OF THE INVENTION

In accordance with an aspect of the present invention, a distributed transmission system is provided. A data source generates a digital signal. A central data processing component inserts synchronization data into the digital signal. The synchronization data includes a periodic reset signal. Each of a plurality of radio frequency transmitters comprises a Trellis coder. At least one Trellis coder state at each Trellis coder is reinitialized to a predefined default state in response to the reset signal.

In accordance with another aspect of the present invention, a transmitter apparatus within a distributed transmission system is provided. A Trellis coder, having a plurality of Trellis coder states, provides forward error correction to a digital signal. A synchronization component provides synchronization input to a plurality of components associated with the transmitter in response to synchronization data associated with the digital signal. The synchronization component instructs the Trellis coder to reset at least one Trellis state to a default value in response to a reset signal associated with the synchronization data.

In accordance with yet another aspect of the present invention, a method is provided for synchronizing a plurality of transmitters in a distributed network. A periodic reset signal is generated within a digital data stream. At least one Trellis coder state within a Trellis coder associated with each transmitter is reset to a default state in response to the periodic reset signal.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein.

DESCRIPTION OF THE PREFERRED EMBODIMENT

Figure 1:
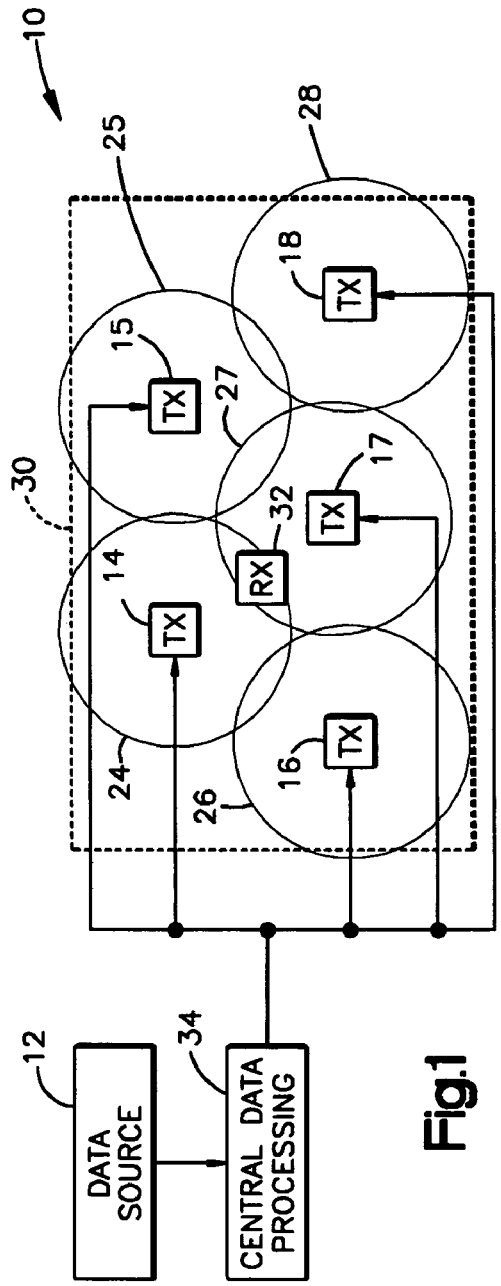
FIG. 1 illustrates a distributed transmission system in accordance with an aspect of the present invention.

FIG. 1 illustrates a distributed transmission system 10 in the form of a signal frequency network. The single frequency network provides a distributed broadcast of a common digital signal from a data source 12 at a plurality of different transmitters 14-18. Each transmitter 14-18 has an associated service region 24-28 that comprises a portion of an overall service region 30. The use of a single frequency network allows each transmitter 14-18 to use a lower level of power than would be required in a single transmitter system, while providing superior signal levels through the periphery of a service area. This allows the individual transmitters to use less expensive components and provides superior control of interference with neighboring channels.

A challenge in the use of single frequency networks is the possibility that a receiver 32 within the overlap of two or more service regions (e.g., 24 and 27) will receive signals from multiple transmitters (e.g., 14 and 17). In such a case, there are two main requirements on the signals form the different transmitters: the signals should be identical and within a reasonable delay. If so, the receiver 32 will view the multiple signals as echoes, such as multipath reflections, and attempt to resolve them via equalization. If the phase shift between the signals is large, a considerable strain can be placed on the equalizer, and the quality of the recovered signal can suffer. Accordingly, it is desirable that the transmitters 14-18 be synchronized to produce the same signals at the same time in response to a given digital input.

This synchronization can be accomplished at a central data processor 34 associated with the data source. The central data processor adds synchronization data to the digital signal from the data source to allow the transmitters 14-18 to operate synchronously. For example, the synchronization data can include a cadence signal comprising a plurality of cadence packets that mark positions at which frame synchronization packets used by the receiver 32 can be inserted by the transmitters 14-18. In one example utilizing MPEG-2 data, the cadence signal can be formed by inverting the value at the MPEG-2 data packet synchronization word at the beginning of every other field (e.g., at the beginning of each frame). This allows the various transmitters to coordinate the beginning of each data frame according to an associated time reference (e.g., a GPS receiver). In an alterative embodiment, the synchronization data can instead utilize a frame-level time stamp, inserted in place of every other MPEG-2 synchronization word that instructs the transmitters 14-18 as to when the frame should be transmitted and provides any other operation necessary for synchronization.

The synchronization data can also include a reset signal. The reset signal instructs the transmitters 14-18 to reset one or more of the Trellis states of its associated Trellis coder to a predefined default state. By predefined, it is meant that the default state is independent of any data within, preceding, or following the reset signal. In one example, when the signal is first received, a first Trellis state at each transmitter can be reset, the second instance of the signal can direct the next Trellis state to reset, and so on, until all of the Trellis states have been reset. Similarly, a special synchronization signal can instruct the transmitters to reset the first trellis coder, or to wait until the next frame synch to do so, and the next trellis coder is reset upon reception of the next frame synchronization signal and so on, until all the trellis coders have been reset once. In another implementation, the trellis coders could be reset upon the reception of the first frame sync received after a 1 second GPS pulse, or 1 min. GPS pulse. Since a given Trellis state is reset simultaneously at all transmitters 14-18, relative the received data stream, this has the effect of synchronizing the Trellis coders across the transmitters.

In an exemplary embodiment, the cadence signal or the frame-level time stamp can be utilized as the reset signal, such that a Trellis state is reset whenever a cadence packet or frame-level time stamp is received. It will be appreciated that in such an implementation, the Trellis coding can be maintained without adding overhead to the signal. If the receiver is configured to the ATSC standard, resetting the Trellis states violates the standard and will introduce a small amount of error into the signal. The error is negligible, however, and can be corrected via standard forward error coding. If the receiver is configured to the described system, one of the reserved bits in a reserved field of the ATSC frame synchronization packet can be utilized as a reset bit to notify the receiver when a Trellis state has been reset, removing this source of error.

It will be appreciated that the described system enjoys several advantages over existing art. To begin with, it requires little or no overhead in its implementation, saving available bandwidth between the data source and the transmitters for the video data. It is also more robust than prior systems. The appropriate points for inserting the frame synchronization packet and resetting of the Trellis code states can be determined for some time according to an external time reference, such as a GPS receiver. Prior art systems, however, rely on data within the digital stream (e.g., the Trellis packets of the Weiss system) to synchronize the Trellis states. Such a transmitter can completely lose synchronization with the other transmitters in the system when the digital data stream is lost for a short time. It cannot resume transmitting until another configuration packet for the encoder is received. This requires such packets to be sent frequently, increasing the required overhead.

Figure 2:
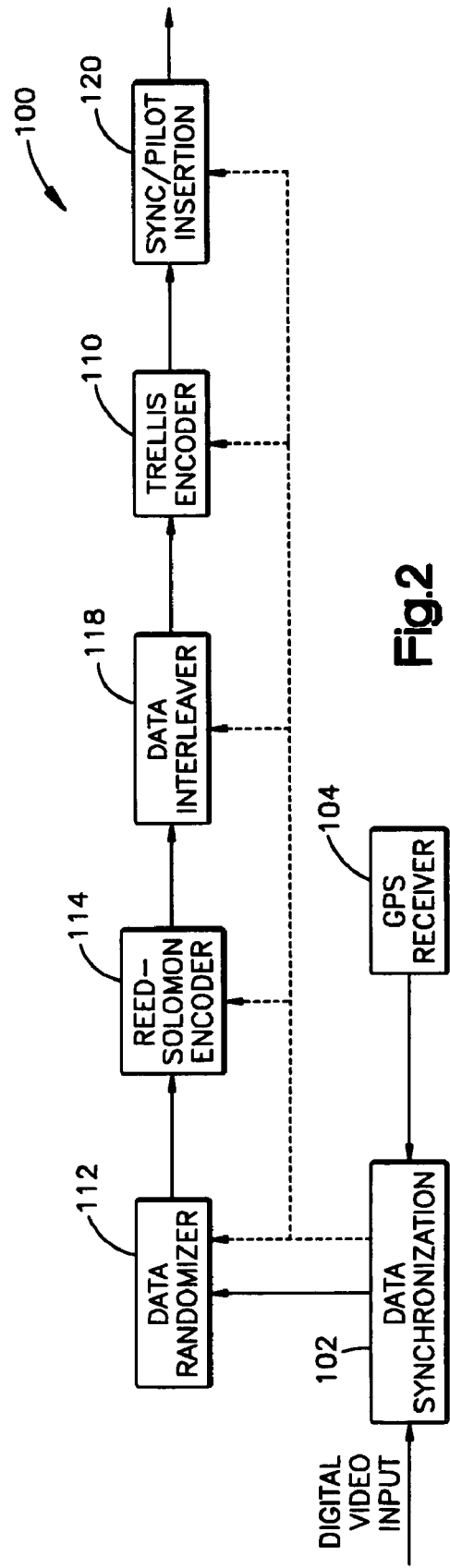
FIG. 2 illustrates an exemplary exciter associated with one of a plurality of transmitters within a single frequency network in accordance with the present invention.

FIG. 2 illustrates an exemplary exciter 100 associated with one of a plurality of transmitters within a single frequency network in accordance with the present invention. The exciter 100 receives digital video data from a data source (not shown), processes and modulates the data, and provides the modulated data to a transmission structure (not shown). For example, the transmission structure can include modulation components for producing an 8-VSB signal or one or more RF antennas associated with the exciter 100. The digital video data can be preprocessed at a central processor (not shown) to add synchronization data to the video data.

The preprocessed video data is received at a data synchronization component 102. The data synchronization component 102 synchronizes the various components of the transmitter 100 both within the transmitter 100 and with the other portions of the distributed transmission system according to the incoming signal. In one implementation, the transmitter synchronization can utilize an external time reference at a GPS receiver 104 and time stamps within the received input signal to synchronize the various components of the transmitter 100 with corresponding component at other transmitters within of the distributed transmission network. To facilitate signal processing, the data synchronization component 102 can buffer the incoming data signal and identify synchronization data at the segment, field, and frame level within the data signal. Generally, the digital video data will include synchronization data, but additional synchronization data can be added at the central data processor (not shown). This synchronization data is effective for synchronizing most of the processing components within the transmitter 100, as most of the components simply recycle at all data field and data frame boundaries. As will be discussed later, a reset signal can also be embedded in the preprocessed video data to facilitate synchronization of the Trellis coder 110.

Once the other transmitter components have been appropriately synchronized, the input signal is provided to a data randomization component 112. At the data randomization component 112, the input signal undergoes a byte-by-byte transformation according to known pattern of pseudo-random number generation. The randomization process can be reversed at a digital television (DTV) receiver (not shown) associated with the system in order to recover the proper data values.

The randomized data is then passed to a Reed-Solomon encoder 114. The Reed Solomon encoder 114 applies a Forward Error Correction (FEC) scheme to the incoming data stream. Forward error correction is a general term used to describe a variety of techniques that can be used to correct bit errors that occur during transmission. Atmospheric noise, multipath propagation, signal fades, and transmitter non-linearities can all create received bit errors. Forward error correction can detect and correct these errors, up to a reasonable limit.

The Reed-Solomon encoder 114 mathematically manipulates the bytes within a given segment as a block to create a series of parity bytes for the segment. The Reed-Solomon parity bytes can be tacked onto the tail end of the original segment by the encoder 114. When the segment is received at a DTV receiver, it is compared to the parity bytes to determine the validity of the recovered data. If errors are detected, the receiver determines that the parity bytes no longer correspond to the segment content and searches for a similar segment (e.g., with only a few bit positions changed) that most closely matches the received parity bits.

The encoded signals are then provided to a data interleaver 118. The data interleaver scrambles the sequential order of the data stream and disperses the data within the signal over a period of time through the use of memory buffers. The data interleaver 118 then assembles new data packets incorporating tiny fragments from many different segments. Data interleaving is done according to a known pattern, and the process can be reversed in the receiver to recover the proper data order. When a given segment is lost during transmission, due to burst interference or similar phenomenon, for example, only a small amount of data is lost from each of a plurality of original segments. Since the data loss for any one segment is minimal, the Reed-Solomon encoding may allow the receiver to reconstitute lost portions of the signal.

The Trellis coder 110 is yet another form of forward error correction. Unlike Reed-Solomon coding, which treats the entire MPEG-II packet simultaneously as a block, trellis coding is an evolving code that tracks the progressing stream of bits as it develops through time. Accordingly, Reed-Solomon coding is known as a block code, while Trellis coding is a convolutional code. At the Trellis coder 110, each eight-bit byte is split up into a stream of four, two-bit words. Each two-bit word that arrives is compared to the past history of previous two-bit words. A three-bit binary code is mathematically generated to describe the transition from the previous two-bit word to the current one. These three-bit codes are substituted for the original two-bit words and transmitted over the air as the eight level symbols of 8-VSB. For every two bits that go into the trellis coder, three bits come out. For this reason, the trellis coder in the 8-VSB system is said to be a ⅔-rate coder.

At the receiver uses the received three-bit transition codes to reconstruct the evolution of the data stream from one two-bit word to the next. In this way, the trellis coder follows a "trail" as the signal moves from word to word. The power of trellis coding lies in its ability to track a signal's history through time and discard potentially faulty information (errors) based on a signal's past and future behavior. When some of the three-bit transition codes are corrupted during transmission, so as to produce impossible combinations, the trellis decoded will consider several alternative signal trails to find the most likely candidate for the correct one.

In the illustrated example, the Trellis encoder 110 buffers incoming data and processes the data in twelve parallel streams operating as virtual Trellis encoders. Accordingly, there are twelve individual Trellis states comprising a total of thirty-six bits that require synchronization. In accordance with an aspect of the present invention, a periodic reset signal can be embedded into the preprocessed video data and received at the synchronization component 102.

In response to the reset signal, the synchronization component 102 can instruct the Trellis encoder 110 to reset the three-bit state associated with one of the twelve parallel Trellis coding streams to a default value. After a delay, measured from the GPS receiver 104, a second stream is reset, and so on, until all twelve Trellis coding streams have been reset. The periodic reset signal can be represented in the output of the transmitter as well. The plurality of transmitters can be configured to reset their Trellis coders in the same manner in response to the reset signal, timed to coincide with the as to ensure that the coders are reset simultaneously. In an exemplary embodiment, the frame-level synchronization within the digital signal can be utilized as the reset signal.

The Trellis coded signal is then provided to a synchronization and pilot inserter 122. The synchronization and pilot inserter 122 provides the various "helper" signals to the Trellis coded signal that aid the receiver in accurately locating and demodulating the transmitted RF signal. These are the ATSC pilot, segment synchronization, and field synchronization. The pilot and synchronization signals are inserted after the randomization and error coding stages so as not to destroy the fixed time and amplitude relationships that these signals must possess to be effective.

The ATSC pilot is added to the signal by applying a small DC shift to the 8-level baseband signal just before the signal is modulated for transmission. Prior to this adjustment, the signal was centered about zero volts with no DC component. This adjustment causes a small residual carrier to appear at the zero frequency point of the resulting modulated spectrum, which serves as the ATSC pilot signal. The pilot signal gives the RF phase locked loop circuits in the receiver a signal to lock onto that is independent of the transmitted data.

In addition, segment, field, and frame level synchronization are added to the signal. An ATSC data segment is comprised of the 207 bytes of an interleaved data packet. After trellis coding, the 207-byte segment has been stretched out into a stream of 828 eight-level symbols. The ATSC segment synchronization is a four-symbol pulse that is added to the front of each data segment and replaces the first byte (packet synchronization byte) of the original MPEG-II data packet. The segment synchronization appears once every 832 symbols and can take the form of a positive-negative-positive pulse swinging between the +5 and −5 signal levels. Correlation circuits in the 8-VSB receiver home in on the repetitive nature of the segment synchronization. The recovered segment synchronization is used by the receiver to regenerate the system clock and sample the received signal.

Three hundred and thirteen consecutive data segments are combined to make a data field. The ATSC field synchronization is an entire data segment that is repeated once per field. The ATSC field synchronization has a known data symbol pattern of positive-negative pulses and is used by the receiver to reduce the effect of signal ghosts caused by poor reception. This is done by comparing the received field synchronization with errors against the known field synchronization sequence before transmission. The resulting error vectors are used to adjust the taps of the equalizer at the receiver equalizer. Like segment syncs, the large signal level swing and repetitive nature of field syncs allow them to be successfully recovered at very high noise and interference levels. Frame synchronization can be handled by inverting a portion every other field synchronization segment to create a frame synchronization segment. The receiver recognizes the segment as marking the beginning of a new frame.

In an exemplary implementation, the synchronization and pilot inserter 122 can also provide a reset signal for inclusion in the transmitters' outputs upon the reset of one or more Trellis coder states to notify the receivers that the one or more Trellis coder states have been reset to their default values. This allows a receiver to adjust to the new value without the likely bit error that would result from simply resetting the Trellis states.

Figure 3:
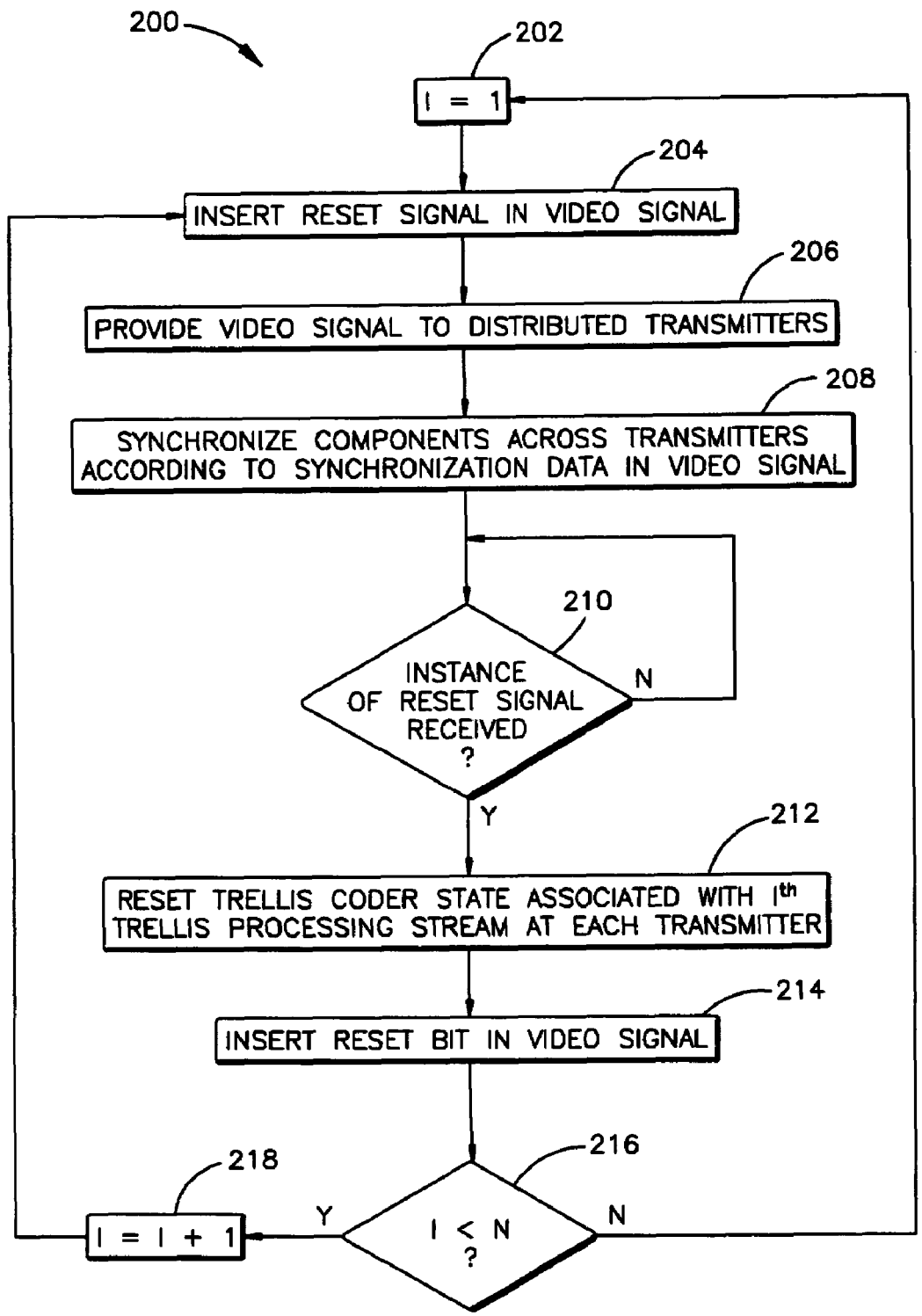
FIG. 3 illustrates a method for synchronizing the operation of a plurality of transmitters.

In view of the foregoing structural and functional features described above, a methodology in accordance with various aspects of the present invention will be better appreciated with reference to FIG. 3. While, for purposes of simplicity of explanation, the methodology of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 3 illustrates a method 200 for synchronizing the operation of a plurality of transmitters. The illustrated method 200 allows the plurality of transmitters to transmit a digital video signal from a common data source at substantially the same time as to reduce multipath reception at an associated receiver. The method 200 begins at step 202, where a counter, I, is initialized to a value of one. At 204, a reset signal is inserted into a digital video signal at a central data processor associated with the common data source. The reset signal can be inserted into the digital video signal by any appropriate method.

At step 206, the digital video signal is provided to the plurality of transmitters. The various components within the transmitters are synchronized according to synchronization data within the digital video signal at step 208. The synchronization data can be provided with the digital signal from the data source. For example, where the digital video signal is MPEG-2 formatted, the packet synchronization words provide synchronization data for the processors. Other synchronization data, such as a frame-level cadence signal or time stamp can be added at the central data processor. In an exemplary implement, the reset signal is simply a frame-level synchronization signal applied at the central data processor, such that an instance of the reset signal occurs at the beginning of every data frame.

At 210, the transmitter waits for an instance of the reset signal to be received. It will be appreciated that the Trellis coding in a given processor can be performed as N parallel processing streams, such that a number of bytes, N, can be Trellis coded simultaneously. Each of these streams effectively operates as a "virtual" Trellis coder for every $N^{th}$ byte of the digital video signal. When an instance of the reset signal is received, the methodology advances to step 212, where a Trellis processing stream corresponding to the value for I is reset to a default state. Accordingly, the three bit state associated with the selected processing stream is reset to a default value, such as zero.

The method then advances to step 214, where a reset bit is insert into the coded video signal. The reset bit is included to inform the receiver that Trellis state for a given processing stream has been reset. The method then advances to 216, where it is determined any of the parallel processing streams have not been reset (e.g., if I<N). If additional processing streams remain to be reset, the method advances to step 218, where the counter, I, is incremented by one. The method then returns to step 204 to perform another cycle of synchronization for the newly selected Trellis encoder. If all N processing streams have been synchronized, the method returns to step 202, where the counter, I, is reinitialized, and the synchronization process begins again with the first Trellis processing stream.

It will be appreciated that by imposing a sequential order on the Trellis state reset, it can be ensured that the Trellis state at each processing stream is reset with approximately the same frequency. The reset signal will force the reset of either all the Trellis coders, or the first one and after some predetermined time, known to all the transmitters, reset the next Trellis coder and so on. It is also possible to reset a first group of Trellis coders upon reception of the reset signal and the reset a second group op trellis coders after some predetermined delay, a third group after some other predetermined time etc, until all the Trellis coders have been reset. Furthermore, different reset signals can be used, each associated with an individual Trellis coder, or with a group of Trellis coders.

From the above description of the invention, those skilled in the art will perceive improvements, changes and modifications in the invention. Such improvements, changes and modifications within the skill of the art are intended to be covered by the appended claims.

Having described the invention we claim:

1. A distributed transmission system comprising:
   a data source that generates a digital signal;
   a central data processing component that inserts synchronization data into the digital signal, the synchronization data including a periodic reset signal; and
   a plurality of radio frequency transmitters, each transmitter comprising a Trellis coder, a first set of Trellis coder states at each Trellis coder being reinitialized to a predefined default state in response to the periodic reset signal and a second set of Trellis coder states being reinitialized to the predefined default state after a predetermined delay after the periodic reset signal is received at the Trellis coder.

2. The system of claim 1, the digital signal being carried in an MPEG-2 transport stream.

3. The system of claim 1, the synchronization data including a cadence signal, the plurality of transmitters inserting frame-level synchronization packets into the digital signal according to the cadence signal.

4. The system of claim 1, the synchronization data including a time stamp associated with each frame of data that instructs each of the plurality of transmitters to transmit the frame at a given time.

5. The system of claim 1, wherein the periodic reset signal repeats with each frame of data.

6. The system of claim 5, wherein the periodic reset signal is provided by frame-level synchronization in the digital signal.

7. The system of claim 1, the output of the transmitter being provided in an 8-VSB format.

8. A signal processing apparatus within a distributed transmission system, comprising:
   at least one Trellis coder that provides convolutional forward error correction to a digital signal; and
   a synchronization component that provides synchronization input to a plurality of components associated with the transmitter in response to synchronization data associated with the digital signal, the synchronization component instructing the Trellis coder to reset a current Trellis state of each of the at least one Trellis coder to a predetermined value during transmission of the signal in response to a reset signal associated with the synchronization data, the reset signal being provided to the synchronization component from a source external to the signal processing apparatus.

9. The apparatus of claim 8, further comprising a Reed-Solomon encoder that provides block forward error coding for the digital signal.

10. The apparatus of claim 8, further comprising a pilot and synchronization insertion component that provides a reset signal to the digital signal that notifies an associated receiver when the at least one Trellis code state has been reset.

* * * * *